J. K. PROCTOR.
Assignor of one-half interest to J. SMITH & Co.
Wool-Washing Machine.
No. 8,473. Reissued Oct. 29, 1878.
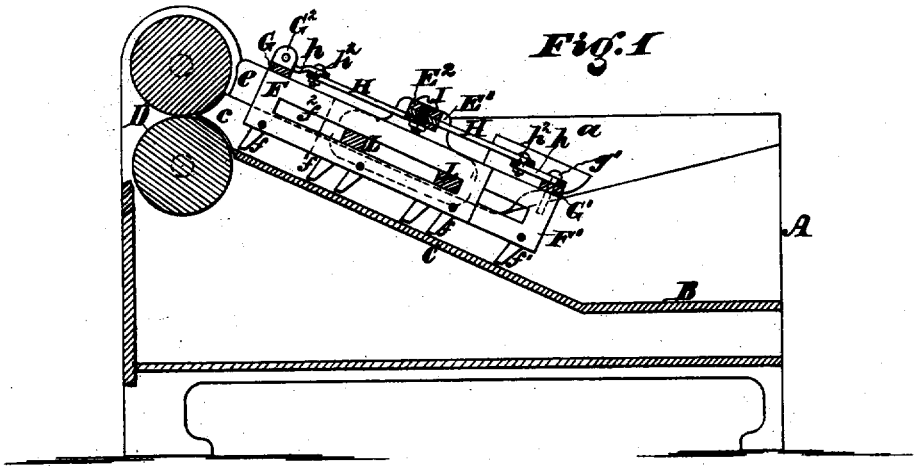
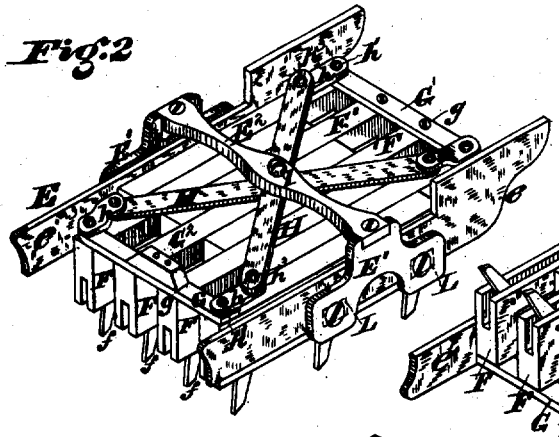
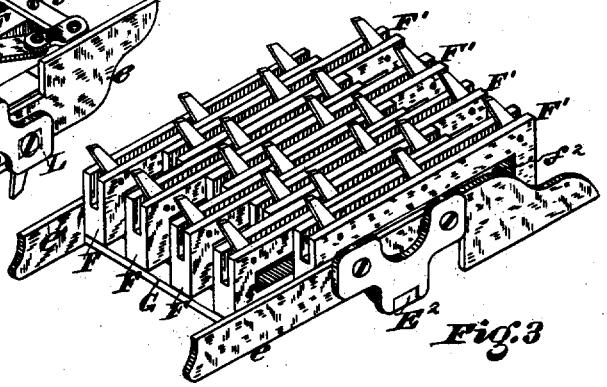
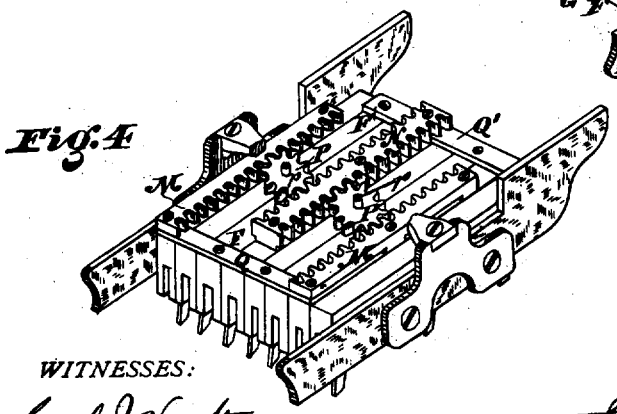
WITNESSES:
Saml. J. Vanstavoren
Jos. B. Connolly
INVENTOR,
Josiah K. Proctor,
By Connolly Bros,
ATTORNEYS.
N. PETERS, PHOTO-LITHOGRAPHER, WASHINGTON, D. C.

UNITED STATES PATENT OFFICE.

JOSIAH K. PROCTOR, OF PHILADELPHIA, PENNSYLVANIA, ASSIGNOR OF ONE-HALF INTEREST TO JAMES SMITH & CO., OF SAME PLACE.

IMPROVEMENT IN WOOL-WASHING MACHINES.

Specification forming part of Letters Patent No. 163,250, dated May 11, 1875; Reissue No. 8,473, dated October 29, 1878; application filed July 1, 1878.

*To all whom it may concern:*

Be it known that I, JOSIAH K. PROCTOR, of Philadelphia, in the county of Philadelphia and State of Pennsylvania, have invented certain new and useful Improvements in Wool-Washing Machines; and I do hereby declare that the following is a full, clear, and exact description of the invention, that will enable others skilled in the art to which it appertains to make and use the same, reference being had to the accompanying drawings, and to the letters of reference marked thereon, which form a part of this specification, in which—

Figure 1 is a vertical longitudinal section. Figs. 2 and 3 are perspective views of the carrier, and Fig. 4 is a perspective view of the rack and pinion carrier.

The object of my invention is to provide a reciprocating carrier of a wool-washing machine so constructed and operated that for each delivery or forward movement of the fork there shall be two forward movements on the part of the carrier over the chute or incline.

In Patent No. 163,252, granted to Proctor and Lindsay, May 11, 1875, it will be noticed that the pitman is connected to the crank of the fork-shaft, so that at each revolution of said shaft the carrier will be caused to move forward a distance equal to the throw of the crank. Thus, for example, if said crank have a throw of twelve inches, the carrier will be moved twelve inches for every revolution of the shaft and at every forward movement of the fork. Hence for every delivery of the fork there is a corresponding forward movement of the carrier, and only one such movement. The entire amount of stock thus deposited at the base of the incline C by the fork at each forward movement must on the next forward movement of the carrier be taken up the incline by the rear row of teeth of said carrier. I have discovered that this method of operation is open to objection for the following reasons: The one movement of the carrier for each movement of the fork causes the stock to bunch or accumulate both at the base of the incline and more particularly above the carrier and immediately in front of the squeeze-rolls. To remedy this defect, I provide a carrier so constructed that it shall have two forward movements for each single forward movement of the fork, whereby the stock delivered by a single forward movement of the fork is moved up the incline by two movements of the carrier.

In Figs. 1, 2, and 4 of the accompanying drawing I have illustrated mechanical appliances whereby the principle of my invention may be carried into effect, wherein A shows the tank or bowl of a wool-washing machine, having a false bottom, B, incline C, and squeeze-rollers D D, these several parts being of the usual or any suitable construction.

E is a frame composed of two sides, *e e*, adapted to rest on the vertical sides *c c* of the chute or incline C; and $E^1$ $E^1$ are guide or stay blocks parallel with the side pieces *e e*, and adapted to rest outside of the sides *c c* or between the latter and the sides *a a* of the bowl A. Said blocks $E^1$ $E^1$ are connected by a girt or cross-beam, $E^2$.

F and F′ are two series of parallel bars arranged between the sides *e e*, provided with downwardly-projecting teeth $f f^1$, operating to carry up the stock on their forward movement toward the squeeze-rollers and to rise on their backward movement toward the bottom of the bowl or base of the incline.

I have illustrated in the drawings means for communicating reciprocating and alternating motions to the parallel bars F F′, which I shall now proceed to describe in detail.

G is a cross-bar, to which the bars F are secured at their upper ends, and G′ is another cross-bar, to which the bars F′ are secured at their lower ends by means of screws or pins *g g′*.

*h h h h* are plates, secured by pivotal pins $h^1$ $h^1$ to the cross-bars G G′ at the four corners of the carrier; and H H are diagonal bars or plates, hung on a central pivot bolt or pin, I, which passes through the cross-girt E, their ends being pivotally connected at $h^2$ $h^2$ with the plates *h*.

A to-and-fro movement being communicated to one set of the parallel bars F F′, as by a connection with the fork or wool-deliverer, the other set of said bars will be alternately reciprocated. Thus one set of bars on one forward movement of the carrier (corresponding to the forward movement of the fork) will take up on the incline C, say, one-half the single delivery of the fork, while the next forward movement of the carrier (made while the fork is receding) will take up the remainder of the stock composing said single delivery. In this way the stock deposited by a single delivery of the fork at the base of the incline is, by two motions of the carrier, lifted up the incline, and the bunching or accumulation of such stock heretofore incident to the employment of a carrier moving in even time with the fork is largely reduced.

To retain the bars F F′ at the required distance above the incline, they may be slotted, as shown at $f^2$, cross-bars L L extended between and connected to the frame-pieces *e e* passing through said slots.

As an equivalent and preferable method of producing an alternate reciprocating motion of the bars F F′, I employ the devices shown in Fig. 4, consisting of the racks M M, secured to the cross-bar Q, to which the parallel bars F are attached, and the rack N, secured to the cross-bar Q′, to which the parallel bars F′ are fastened.

P P are pinions, whose shafts *p p* have bearings in the cross-girt $E^2$, said pinions gearing with the racks M and M. Reciprocating motion being communicated to one series of the bars F F′, the other series will be alternately reciprocated.

I do not wish to be understood as stating that a double motion of the carrier will take the stock all the way from the base of the incline to the squeeze-rolls, as the contrary is the case, it requiring a number of double movements to effect this; but whatever such number is, it will be twice that of the fork made at the same time. I expressly disclaim in this case all that is shown in the aforementioned patent of Proctor and Lindsay. I concede also as old and well known, broadly, a carrier composed of sections having alternating to-and-fro movements, the said carrier being located and operating below the incline. I also admit that a reciprocating carrier having depending pivoted teeth is old. Accordingly,

What I claim, and desire to secure by Letters Patent, is—

1. The combination of the following elements in a wool-washing machine, viz: a bowl or tank, A, false bottom B, incline C, squeeze-rolls D, and a carrier, E, having downwardly-projecting teeth, and arranged to carry the stock up over the incline by a double movement for every single movement of the fork, as set forth.

2. In a wool-washing machine, a carrier provided with two series of alternately reciprocating bars, F F′, having downwardly-projecting hinged or swinging teeth *f f*, substantially as shown and described.

3. In combination with the incline C, the fixed frame E, provided with the reciprocating bars F, moving over said incline, substantially as shown and described.

4. In combination with the bars F F′, secured to the cross-heads G and G′, the arms *g g′*, for producing an alternate reciprocation of said bars, substantially as shown and described.

In testimony that I claim the foregoing I have hereunto set my hand this 20th day of June, 1878.

JOSIAH K. PROCTOR.

Witnesses:

SAML. J. VAN STAVOREN,
CHAS. F. VAN HORN.